United States Patent Office 2,713,059
Patented July 12, 1955

2,713,059

LEVEL-DYEING DYESTUFFS OF THE ANTHRAQUINONE SERIES

Jacques Günthard, Basel, Switzerland, assignor to Sandoz, A. G., Basel, Switzerland, a Swiss firm No Drawing. Application January 15, 1953,
Serial No. 331,485

Claims priority, application Switzerland January 18, 1952

6 Claims. (Cl. 260—372)

In the wool dyeing art, it is a requirement that dyestuffs which are intended to be used for dyeing woven fabrics be characterized by special properties which assure a uniform distribution of the dyestuff on the fiber as well as over the entire fabric. These properties comprise good water-solubility, slow substantivity rate in the range of reactions from those rendered acid with acetic acid to those rendered acid with sulfuric acid, and the capacity of migrating from strongly covered places to weakly covered places. These properties are, in particular, demanded of those dyestuffs which, as yellow, red and blue, constitute the elements for the production of combination dyeings of all shades. In such a set, the three dyestuffs have to be especially carefully attuned to each other as regards drawing capacity or affinity and as regards leveling capacity, if spotty dyeings are to be avoided. In addition, the fastness properties of the three dyestuffs, and especially their fastness to light, have to be essentially the same.

Acid anthraquinone dyetuffs have already been used as blue components in this connection. For light-fast combinations, certain greenish blues are more especially employed. A pure blue is a desideratum in this regard, in order to make it possible to achieve satisfactory shades in the blue and violet ranges. Such a blue could also replace a greenish blue in other relationships, so as to fulfil the requirement of the art to work with a maximum of three dyestuffs.

It is a primary object of the present invention to embody a group of blue level-dyeing dyestuffs of the indicated character, which fulfil the recited requirements. These dyestuffs which, according to the invention, correspond to the formula

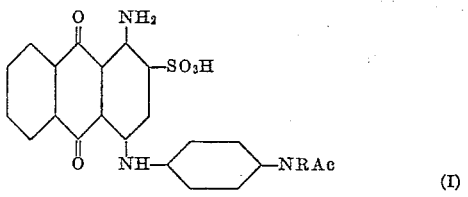

(I)

wherein Ac is an acyl radical of 2 to 4 carbon atoms, and R stands for hydrogen, methyl or ethyl, are prepared:

(a) by treating a 1-aminoanthraquinone-2-sulfonic acid of the formula

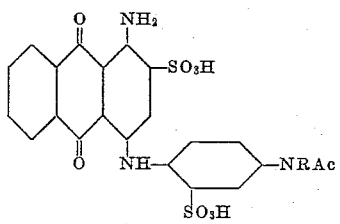

wherein Ac and R have the precedingly-indicated significances, or a salt thereof, with a sulfonating agent; or (b) by reacting a 1-aminoanthraquinone-2-sulfonic acid of the formula

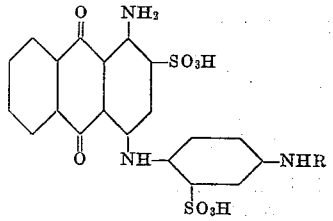

(II)

wherein R has the afore-indicated significance, or a salt thereof, with an acylating agent which introduces an acyl radical of 2 to 4 carbon atoms.

The new dyestuffs dye wool a pure blue of very good fastness to light and have an excellent leveling capacity. They are therefore outstandingly suitable for use in combination dyeings.

If the starting compounds correspond to Formula I—i. e. if alternative (a) is followed—the desired new dyestuffs are obtained by dissolving the starting material in sulfuric acid monohydrate and, at a moderate temperature, adding such quantity of fuming sulfuric acid as is necessary to introduce a sulfonic acid group into the nucleus in the side-chain. The end-point of the reaction is reached when a worked-up test specimen, dissolved in water, gives the uniform chromatogram of the end-product on a column of talc. The introduction of the sulfonic acid group into the phenyl nucleus weakens the carbonamide bond so that care has to be taken, when working up the product, that the acyl radical is not split off. Accordingly, the sulfonation mass is poured, while stirring thoroughly, onto ice and salt-water, and the precipitated dyestuff is filtered off with suction, washed neutral with aqueous sodium chloride solution and dried.

To acylate a starting compound of formula (II), it is dissolved in water or in a tertiary organic base, such for example as pyridine, and acylating agent is added at moderate temperature—about 0° to 50° C.—until a worked-up test specimen, after being diazotized and admixed with an alkaline aqueous solution of 2-hydroxynaphthalene-3,6-disulfonic acid, no longer gives the initially powerful color reaction. The dyestuff is then salted out, and recovered by filtration and drying.

Suitable acylating agents for the introduction of acyl radicals with 2 to 4 carbon atoms are aliphatic compounds, for example acetic anhydride, propionic anhydride, acetyl chloride, propionyl chloride, butyryl chloride, isobutyryl chloride, alkyl esters of chloroformic acid, etc. The symbol Ac, in the formula of starting compounds (I), designates the same acyl radicals as correspond to the precedingly-recited acylating agents.

Compounds I can be prepared, for example, by the condensation of 1-amino-4-bromo-anthraquinone-2-sulfonic acid with 4-amino-1-acylaminobenzenes and 4-amino-1-N-methyl- or -N-ethyl-acylaminobenzenes. Compounds II can be prepared, for example, by the sulfonation of 1-amino-4-(4'-amino)- and -(4'-methyl- or -ethylamino)-phenylaminoanthraquinone-2-sulfonic acid with fuming sulfuric acid or by splitting off the acyl radical from 1-amino - 4 - (4' - acylamino)-phenylaminoanthraquinone-2,2'-disulfonic acid and its 4'-N-methyl- and 4'-N-ethyl-derivatives by boiling with dilute acid.

The following examples set forth representative embodiments of the invention, but the invention is not restricted to these illustrative examples. In the latter, the parts and percentages are by weight, and the temperatures are in degrees centigrade.

*Example 1*

37 parts of sodium 1-amino-4-(4'-acetylamino)-phenylaminoanthraquinone-2-sulfonate are added at 20° to a mixture of 280 parts of sulfuric acid monohydrate and 120 parts of fuming sulfuric acid (having a 25% content of SO₃), and stirring is continued until complete dissolution is achieved. The solution is then heated to 40° and maintained at this temperature until a test specimen dissolves without residue in a cold 5% aqueous sodium chloride solution. The solution is then cooled and poured into a mixture of 1000 parts of water, 1000 parts of finely crushed ice and 200 parts of sodium chloride. The resultant precipitated dyestuff is filtered off, washed with a 15% aqueous sodium chloride solution, and then pasted up with sodium carbonate until a weak alkaline reaction is detectable. After being dried, the dyestuff is in the form of a blue powder. It corresponds to the formula

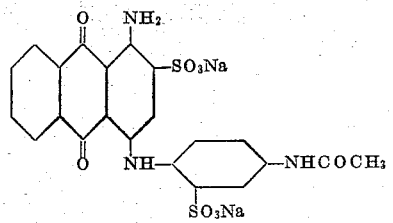

and dissolves in water with blue coloration which remains unchanged upon acidification. It dissolves in sulfuric acid with violet coloration; the color of this solution turns toward the green upon the addition of boric acid or formaldehyde. The dyestuff draws onto wool from an acid bath in pure blue shades of good fastness to washing and excellent fastness to light. The dyestuff draws slowly onto the fiber and yields very uniform dyeings.

The identical dyestuff is obtained when, while otherwise proceeding as set forth in the preceding paragraph, the 37 parts of the sodium salt are replaced by 35 parts of the free 1-amino-4-(4'-acetylamino)-phenylaminoanthraquinone-2-sulfonic acid, which is subjected to the sulfonation.

An equally good level-dyeing dyestuff of equally good fastness to light, which corresponds to the formula

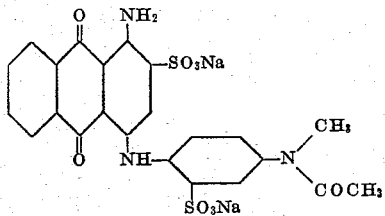

is obtained by replacing the 37 parts of the sodium 1-amino-4-(4'-acetylamino)-phenylaminoanthraquinone-2-sulfonate, in the first paragraph of the present example, by 38 parts of sodium 1-amino-4-(4'-acetyl-methylamino)-phenylaminoanthraquinone-2-sulfonic acid.

A dyestuff of equally good shade and properties, and which corresponds to the formula

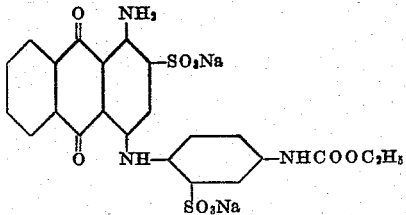

is obtained when, under the same conditions, potassium 1-amino-4-(4'-carbethoxyamino)-phenylaminoanthraquinone-2-sulfonate is subjected to the sulfonation.

If, in the first paragraph of the present example, the 37 parts of sodium 1-amino-4-(4'-acetylamino)-phenylaminoanthraquinone-2-sulfonate are replaced by 38 parts of sodium 1-amino-4-(4'-propionylamino)-phenylaminoanthraquinone-2-sulfonate—prepared for example by treating sodium 1-amino-4-(4'-amino)-phenylaminoanthraquinone-2-sulfonate with propionyl chloride, there is obtained a dyestuff which corresponds to the formula

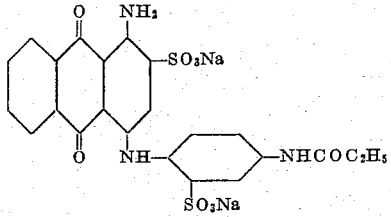

and which has an equally good drawing capacity and exhibits equally good fastness to wet treatments and to light.

*Example 2*

6 parts of sodium bicarbonate and 11.5 parts of sodium 1-amino-4-(4'-amino)-phenylaminoanthraquinone-2,2'-disulfonate are dissolved in 100 parts of water. Then 5 parts of propionic anhydride are added dropwise at 20–25°. Two hours after the addition of the anhydride, a diazotized test specimen of the reaction solution no longer couples with sodium 2-hydroxynaphthalene-3,6-disulfonate. The reaction solution is then acidified and the formed dyestuff is precipitated by the addition of sodium chloride. The dyestuff is filtered off, redissolved in a 10% aqueous sodium chloride solution, adjusted to weak alkalinity with sodium carbonate, filtered off with suction and dried. In this way, sodium 1-amino-4-(4'-propionyl-amino)-phenylaminoanthraquinone-2,2'-disulfonate, corresponding to the formula

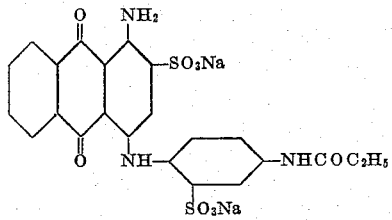

is obtained in the form of a dark blue powder. This powder dissolves in water with pure blue coloration, and in concentrated sulfuric acid with violet coloration; the latter color turns toward the green upon addition of boric acid or formaldehyde. The dyestuff draws very uniformly onto wool from an acid bath. The dyeings are characterized by good fastness to washing and excellent fastness to light.

If, in the preceding paragraph, the 5 parts of propionic anhydride are replaced by 5 parts of acetic anhydride, there is obtained a similar dyestuff, which corresponds to the formula

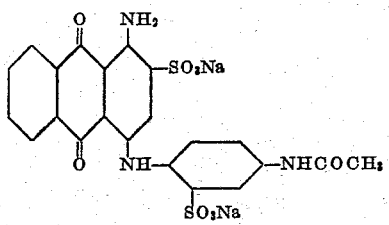

and which can be readily recovered from the solution, upon completion of the acetylation, by careful neutralization with sodium carbonate. The dyestuff also draws very uniformly onto wool; its dyeings are of excellent fastness to light.

*Example 3*

11.5 parts of potassium 1-amino-4-(4'-amino)-phenylaminoanthraquinone-2,2'-disulfonate are dissolved in 50 parts of anhydrous pyridine, after which 6 parts of sodium bicarbonate are added. Then, while cooling to 15–20°, 5 parts of propionyl chloride are added dropwise. The reaction mass is kept at 20–25° for the next two hours and then at 40° for one hour. A test specimen of the reaction solution will then, after being diazotized, no longer couple with sodium 2-hydroxynaphthalene-3,6-disulfonate, thus indicating the end of the reaction. The reaction mixture is then poured into water, adjusted to alkalinity by the addition of a small quantity of potassium carbonate, and the pyridine distilled off with steam. Finally, by the addition of potassium chloride, the dyestuff is precipitated. It corresponds to the formula

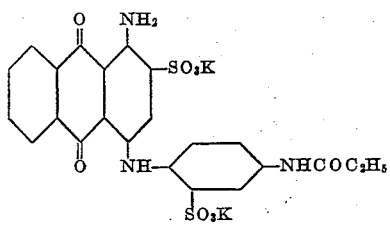

and is identical in its dyeing properties with the dyestuff disclosed in the first paragraph of Example 2.

A similar dyestuff is obtained when, in the foregoing paragraph, the 5 parts of propionyl chloride are replaced by 5 parts of acetyl chloride. The resultant dyeings are distinguished by their uniformity and by their fastness to light.

Another similar dyestuff, corresponding to the formula

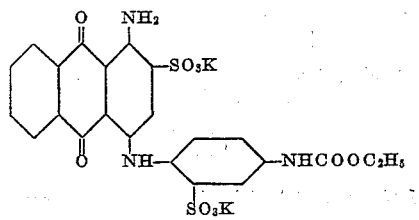

is obtained when the potassium 1-amino-4-(4'-amino)-phenylaminoanthraquinone-2,2'-disulfonate is, under the same conditions, treated with chloroformic acid ethyl ester. The latter may, if desired, be replaced by chloroformic acid methyl ester to yield a similar dyestuff. Dyeings with these dyestuffs on wool are very uniform and of very good fastness to light.

The 5 parts of propionyl chloride may be replaced by 6 parts of butyryl chloride in which case the dyestuff corresponding to the formula

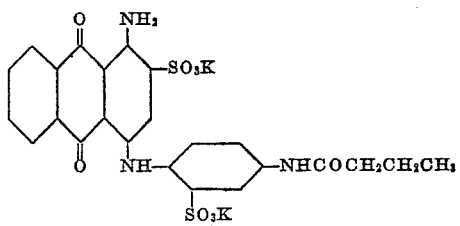

is obtained. If use is made of 6 parts of isobutyryl chloride, the dyestuff corresponding to the formula

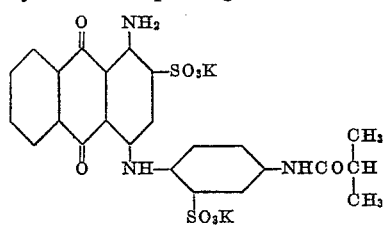

is obtained. These dyestuffs all have properties similar to those of the dyestuff of the first paragraph of this example.

*Example 4*

32 parts of sodium 1-amino-4-(4'-acetyl-ethylamino)-phenylaminoanthraquinone-2-sulfonate are added at 20° and in the course of one hour to a mixture of 75 parts of sulfuric acid monohydrate and 75 parts of 25% oleum, stirring being continued until dissolution is complete. The mass is then warmed to 40° and maintained at this temperature until a test specimen dissolves without residue in a cold aqueous 10% sodium chloride solution. The solution is cooled and poured into a mixture of 375 parts of water, 375 parts of ice and 115 parts of sodium chloride. The precipitated dyestuff is filtered off, washed with an aqueous 20% sodium chloride solution, neutralized in the form of the paste with sodium carbonate, and dried. The dyestuff is thus obtained as a blue powder; it corresponds to the formula

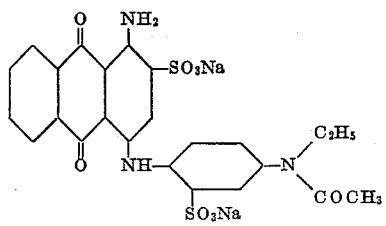

and dissolves in water with blue coloration, which undergoes no change upon being acidified. It dissolves in concentrated sulfuric acid with violet coloration which, upon the addition of boric acid or formaldehyde, turns toward the green. The dyestuff draws uniformly onto wool from an acid bath and the obtained dyeings are distinguished by good fastness to washing and excellent fastness to light.

*Example 5*

11.5 parts of sodium 1 - amino - 4 - (4' - ethylamino)-phenylaminoanthraquinone-2,2'-disulfonate are dissolved in 50 parts of pyridine, and 6 parts of sodium bicarbonate are added to the solution. Then 5 parts of chloroformic acid ethyl ester are added dropwise at 20°, after which the mixture is warmed to 50–60°. The reaction solution is kept at this temperature until the acylation is terminated. The reaction mixture is poured onto 100 parts of water, adjusted to alkalinity with a small quantity of sodium carbonate, and then the pyridine is distilled with steam. The thus-produced dyestuff is salted out, filtered off, washed and dried. There is in this way, obtained a blue powder which corresponds to the formula

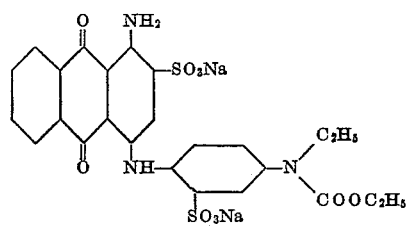

and dissolves in water with a pure blue coloration and in concentrated sulfuric acid with a violet coloration. The color in sulfuric acid turns toward the green upon addition of boric acid or formaldehyde. The dyestuff draws uniformly onto wool from a sulfuric acid bath. The resultant dyeings possess good fastness to washing and to light.

A similar dyestuff results when, in the foregoing, the chloroformic acid ethyl ester is replaced by an equivalent amount of chloroformic acid isopropyl ester.

*Example 6*

1 part of the dyestuff obtained according to Example 1, paragraph 3, is dissolved in 400 parts of distilled water. 20 parts of the resultant solution are added to a dye-bath of 300 parts of water and 0.5 part of anhydrous sodium sulfate, after which 5 parts of pre-wetted wool are entered into the bath. 0.1 part of concentrated sulfuric acid is then added, and the bath heated to boiling in the course of 15 minutes. After boiling for a half hour, 0.1 part of concentrated sulfuric acid is again added, and the boiling continued for another half hour. The wool is then withdrawn from the bath, washed and dried. It is dyed a uniform blue.

The dyestuff of the preceding paragraph may, with equal success, be replaced by a corresponding quantity of any of the other dyes of Examples 1 to 5.

Having thus disclosed the invention, what is claimed is:

1. A level-dyeing dyestuff of the anthraquinone series which corresponds to the formula

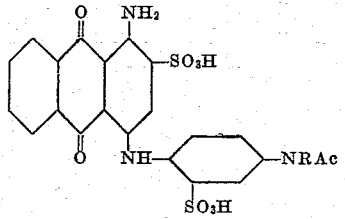

wherein Ac stands for an acyl radical of 2 to 4 carbon atoms, and R stands for a member selected from the group consisting of hydrogen, methyl and ethyl.

2. The level-dyeing dyestuff of the anthraquinone series which corresponds to the formula

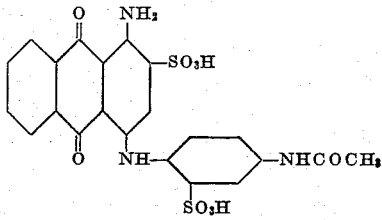

3. The level-dyeing dyestuff of the anthraquinone series which corresponds to the formula

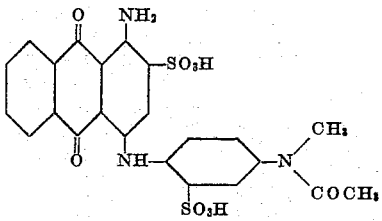

4. The level-dyeing dyestuff of the anthraquinone series which corresponds to the formula

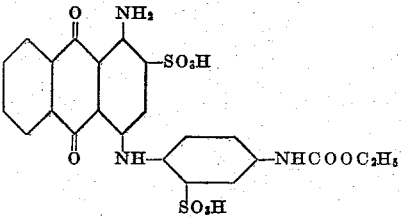

5. The level-dyeing dyestuff of the anthraquinone series which corresponds to the formula

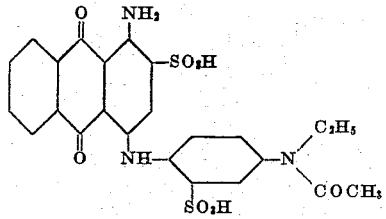

6. The level-dyeing dyestuff of the anthraquinone series which corresponds to the formula

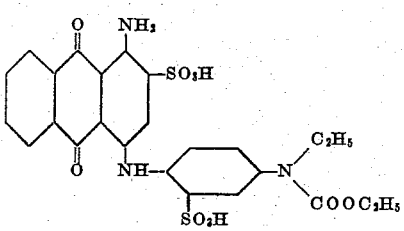

References Cited in the file of this patent

UNITED STATES PATENTS

| | | |
|---|---|---|
| 1,927,125 | Kalischer et al. | Sept. 19, 1933 |
| 2,400,188 | Bamberger | May 14, 1946 |
| 2,453,104 | Vogt | Nov. 2, 1948 |
| 2,485,121 | Verdery et al. | Oct. 18, 1949 |
| 2,541,623 | Allmen et al. | Feb. 13, 1951 |